United States Patent [19]

Norris et al.

[11] Patent Number: 4,849,360
[45] Date of Patent: Jul. 18, 1989

[54] APPARATUS AND METHOD FOR CONFINING AND DECONTAMINATING SOIL

[75] Inventors: Robert D. Norris, East Windsor; Richard A. Brown, Lawrenceville, both of N.J.; George E. Hoag, Storrs, Conn.

[73] Assignee: International Technology Corporation, Torrance, Calif.

[21] Appl. No.: 890,581

[22] Filed: Jul. 30, 1986

[51] Int. Cl.⁴ .................... C12M 1/04; C12M 1/18
[52] U.S. Cl. ................................ 435/264; 435/300; 435/313; 210/747; 210/150; 210/170; 405/128; 405/258
[58] Field of Search ............ 435/262, 264, 300, 299, 435/301, 313, 281; 210/610, 611, 620, 747, 150, 170, 198.1, 205; 405/128, 258

[56] References Cited

U.S. PATENT DOCUMENTS

| | | | |
|---|---|---|---|
| 3,306,447 | 2/1967 | Medeirosi | 210/170 |
| 3,449,247 | 6/1969 | Bauer | 110/8 |
| 3,470,091 | 9/1969 | Budd et al. | 210/7 |
| 3,616,204 | 10/1971 | Linn | 195/2 |
| 3,846,290 | 11/1974 | Raymond | 210/11 |
| 3,856,667 | 12/1974 | Azarowicz | 210/11 |
| 4,050,907 | 9/1977 | Brimhall | 210/170 |
| 4,086,167 | 4/1978 | Tapola et al. | 210/170 |
| 4,194,855 | 3/1980 | Egger | 405/128 |
| 4,201,663 | 5/1980 | Rollag et al. | 210/16 |
| 4,296,884 | 10/1981 | Luebke | 238/2 |
| 4,297,122 | 10/1981 | Wallace | 71/12 |
| 4,333,831 | 6/1982 | Petzinger | 210/170 |
| 4,414,333 | 11/1983 | Olivieri et al. | 435/243 |
| 4,415,661 | 11/1983 | Thirumalachar et al. | 435/174 |
| 4,415,662 | 11/1983 | Thirumalachar et al. | 435/176 |
| 4,493,895 | 1/1985 | Colaruotolo et al. | 435/262 |
| 4,584,102 | 4/1986 | Bogart et al. | 210/610 |

OTHER PUBLICATIONS

Alexander, M., *Microbial Ecology*, John Wiley & Sons, Inc., N.Y., (1971), pp. 94 to 125.

Alexander, M., "Biodegradation of Chemicals of Environmental Concern", *Science*, 211:9, Jan. 1981, pp. 132 to 138.

Dillon, A. P., *Pesticide Disposal and Detoxification*, Noyes Data Corporation, Park Ridge, N.J., (1981), pp. 3 to 9 and 61 to 97.

*Primary Examiner*—Benoit Castel
*Attorney, Agent, or Firm*—Luedeka, Hodges & Neely

[57] ABSTRACT

The invention is an apparatus for aerobically biodegrading an organic compound such as a petroleum product which is contaminating a particulate solid such as soil and a process for employing the apparatus. A preferred embodiment comprises a pit lined with an impermeable liner in which gas distributing means and contaminated soils are distributed as alternate layers and air is urged into the gas distributing means.

10 Claims, 1 Drawing Sheet

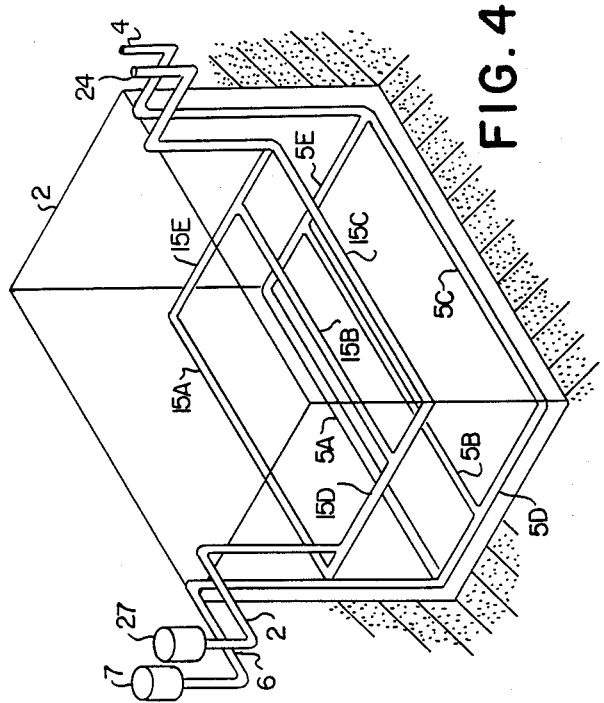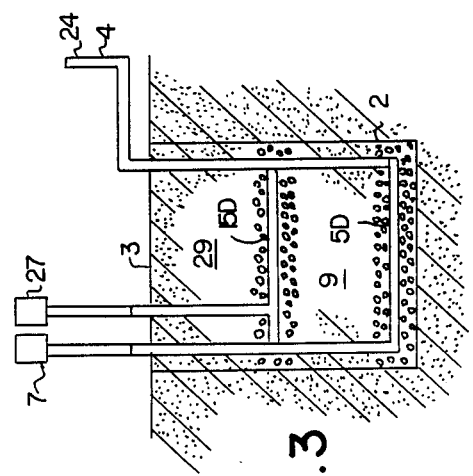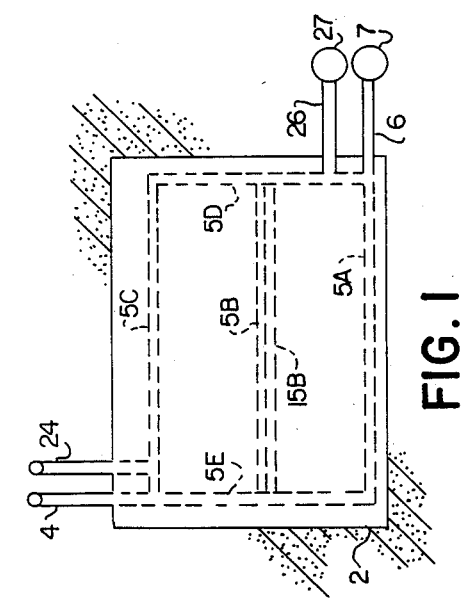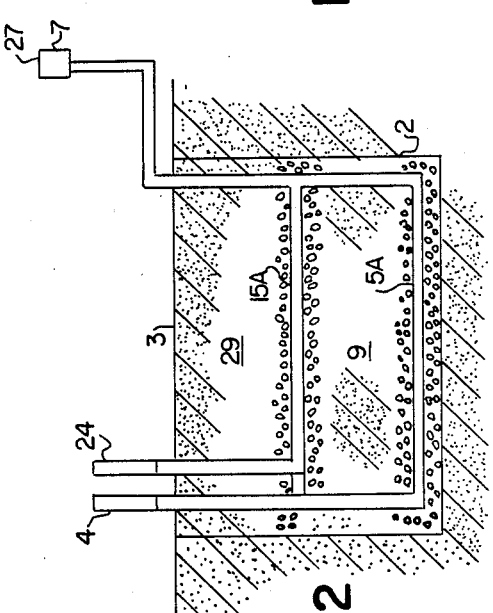

APPARATUS AND METHOD FOR CONFINING AND DECONTAMINATING SOIL

BACKGROUND OF THE INVENTION

The present invention is an apparatus and method to confine contaminated particulate matter contaminated with an organic compound and to aerobically biodegrade the organic contaminant. In particular, the invention is an apparatus and a process utilizing the apparatus to confine soil contaminated with a hydrocarbon formulation, such as gasoline, diesel oil and the like, and to biodegrade the hydrocarbon.

Contamination of soils and groundwater with petroleum products has become one of the major threats to groundwater quality in the United States. A lack of control historically on siting storage tanks coupled with a high rate of tank system failure and the toxic properties of gasoline has created a critical problem for both public and private sectors. Most spill recovery systems available for organic compounds do not address the removal of residual levels of the compounds in the soil, which normally make up an estimated 40 percent to 100 percent of the spilled fluid. Although petroleum products are nominally considered to be hydrocarbons the spilled organic compounds may include detergents, soaps, phosphate esters, methanol, ethanol, ethylene glycol and other additives.

A particular problem facing the retail gasoline industry is the treatment and disposal of spoil piles generated during tank replacement operations. These spoils, typically, are lightly to moderately contaminated soils resulting from spillage, overfilling, and small line leaks in the tank pit. Several hundred cubic yards of soil are commonly removed during tank replacement.

Because of the relatively low level of contamination, often less than 200 ppm, these soils, while in the tank pit, do not represent a significant or immediate hazard to the environment, and, therefore, require no treatment if left in place. However, once excavated, these low levels of contamination require that the soil be treated or removed for disposal. Disposal at secure landfills in 1986 cost $100,000-150,000 per site or more. A low-cost, effective method of on site treatment would offer considerable savings to the industry while providing protection for the environment.

U.S. Pat. No. 3,616,204 to Linn discloses that many species of yeast, bacteria and molds consume hydrocarbons and their derivatives, such as sulfurcontaining organic compounds. Some species are rather specific, even to the molecular weight range. Most of these microorganisms are aerobic, that is, they require molecular oxygen in addition to the carbon from the organic compounds. Further, most require a nutrient medium containing various mineral salts and, depending on the species, ph within a controlled range.

The patent of Linn teaches a process to reduce the contamination of a soil containing organic compounds, such as hydrocarbons and the like, by harrowing or plowing, to increase the permeability of the soil, inoculating the soil with a microorganism capable of metabolizing the organic compound, contacting the soil with a nutrient for the microorganism, and maintaining a gaseous environment such as air adjacent to the soil.

However, the process of the patent to Linn is not suitable for treating soils which must be removed to replace a leaking tank, as most gasoline tanks are not located in the rural farm areas but in areas with considerable paving which results in a high run-off which would tend to spread the contamination to groundwater and aquifers.

It is well-known that indigenous microorganisms in the soil are able to mineralize not only hydrocarbons but most organic compounds. Alexander, M., "Biodegradation of Chemicals of Environmental Concern," Science, Vol. 211,9, January 1981 at pages 132 to 138 discloses that the microorganisms may adapt to utilize the contaminating organic compound as a sole source of organic carbon, or may cometabilize the contaminating compound, that is utilize the contaminating compound together with their normal substrate. As petroleum hydrocarbons generally constitute the largest fraction of the spilled organic compound, the hydrocarbon degrading microorganisms provide a reliable index of the useful microorganisms in the soil.

U.S. Pat. No. 3,846,290 to Raymond discloses a process for utilizing indigenous microorganisms to biodegrade hydrocarbons in contaminated groundwaters. The patent teaches that the hydrocarbons can be completely mineralized by adding nutrients to the groundwater and maintaining the groundwater aerobic.

However, U.S. Pat. No. 3,846,290 relies upon the flow of the groundwater to transfer both the nutrients and the oxygen to the microorganisms. Therefore, the process would not be suitable for biodegrading contaminated particulate matter such as soils which are not in proximity to groundwater.

SUMMARY OF THE INVENTION

The present invention, which overcomes the drawbacks of the prior art, is an apparatus for confining and aerobically biodegrading organic compounds contaminating a mass of particulate solids. The apparatus comprises a container having a bottom and sides or walls continuously connected together and a cover suitable for excluding liquids and solids from entering the container, the sides and bottom being impermeable to water and to the organic compound contained in the particulate solids. At least two treatment courses are disposed in a generally horizontal. attitude in the container, each treatment course comprising a layer of the contaminated particulate solids distributed in a generally horizontal attitude in contact with and subtended by gas distributing means. The thickness of the layer is adjusted to permit the diffusion of a sufficient quantity of a gas containing oxygen into said layer to maintain the layer aerobic. The moisture content of the particulate solids is adjusted to from about 2% to about 90% of field saturation and the nutrient content is adjusted to provide sufficient phosphorus and nitrogen nutrients to ensure that the microorganisms in the particulate solids are not nutrient limited and to stimulate the biodegradation of the organic compounds therein. The gas distributing means, which is subtended by (or disposed under and in contact with) said layer, is permeable to a gas and is connected by inlet conduit means to a source of a gas containing oxygen, to an exhaust conduit means, and to means for urging the gas containing oxygen into the gas distributing means. Optionally, the particulate solids can be inoculated with a suitable microorganism.

In operation, the particulate solids containing the organic contaminant are confined within the container. The impermeable sides and bottom prevent the organic contaminant from leaking out of the container, and the cover prevents the container from being flooded with surface water or precipitation. It is sufficient if the cover excludes sufficient water to maintain the moisture content of the particulate solids within the above range.

The moisture content and the nutrient content of the particulate solids can be most conveniently adjusted prior to, or while the contaminated particulate solids are being distributed in layers in the container. For example, water and nutrients can be applied separately, or together, to the spoil pile prior to distributing it in the container or during the distribution. However, the water and nutrients can both be incorporated into the apparatus by adding them as a mist or as a dust into the gas containing oxygen being urged through the gas distributing means where it will be deposited adjacent to a surface of the contaminated particulate matter.

Below about 2% of field saturation the metabolization of microorganisms is too slow to be useful while above 90% of field saturation the particulate matter may become anaerobic in areas and the gas permeability decreases. Desirably, the moisture content is adjusted to between 20% and 80% of field saturation, preferably about 40% to 60% of field saturation.

The oxygen in the gas diffuses into the layer of particulate matter where it is utilized by a microorganism to metabolize the organic compound. Volatile metabolism products, such as carbon dioxide, and other volatile compounds in the layer of contaminated particulate matter diffuse into the gas containing oxygen and are exhausted from the gas distributing means as additional gas containing oxygen is urged into (and consequently through) the gas distributing means. The nutrient content of the particulate matter should not be so low as to be the limiting factor for the rate of biooxidation. Therefore, it is desirable to provide sufficient phosphorus and nitrogen as nutrients to avoid the biooxidation process from being nutrient limited.

One skilled in the art will recognize that any container which will confine the contaminated particulate matter and which will prevent the intrusion of groundwater, surface water and precipitation will be satisfactory for practicing the invention. In a preferred embodiment of the invention the container is constructed by excavating a pit or containment reservoir in the earth and lining the pit with a lining impervious to the organic compound and to water. It is understood that such an excavated container would be located and formed to prevent the intrusion of a substantial quantity of surface water or of precipitation sufficient to increase the water content of the particulate matter to or above field saturation. When the container is formed by such an excavation a particularly preferred cover for the container is an asphalt or black top paving, particularly if the container is in a location where parking space is at a premium. Desirably, the cover will be provided with access means to permit monitoring the biodegradation of the organic compound and the overall operation of the apparatus.

Although the apparatus and process of the present invention is suitable for biodegrading an organic contaminant on any particulate matter, it is particularly applicable for degrading petroleum products or hydrocarbons on soil. For clarity the invention will be described in detail in terms of this specific application. However, one will readily recognize that the exemplification is applicable to any general contamination of a particulate matter.

The contaminated particulate matter or soil is distributed within the container in layers. As the contaminating organic compound is confined within the impermeable container the importance of time as a factor for biodegradation is greatly reduced. Consequently, many economic savings are possible, such as, employing air as a source of oxygen rather than ozone, pure oxygen or oxygen enriched air; the soil layers can be relatively thick reducing the cost of the gas distributing means; and the soil can be compacted, decreasing the size of the excavation as well as permitting covering of the container with black top paving and using the paved surface for parking.

The design of the system, while fairly simple, should take into account the site microbiology, the soil type and the moisture content of the soil. The site microbiological studies are useful to indicate that the native microbial community is present in a sufficient quantity to biodegrade the organic compound so that it is unnecessary to inoculate the soil. Tests to evaluate the response to the microbial community to added nutients are desirable to optimize the nutrient addition. The soil evaluation determines the clay content, particle size distribution and moisture content relative to field saturation. These properties affect air permeability and thus the spacing and number of vent lines. It is important to provide sufficient venting to provide air throughout all of the soil. However, each set of vent pipes increases the cost of construction. Thus, proper design is desirable to minimize cost yet ensure adequate ventilation.

Adequate oxygen is provided by distributing air across a surface of the soil layer to permit oxygen to diffuse through the soil to the bacteria. Oxygen is effectively supplied through a gas distributing means consisting of slotted pipes placed in layers of pea gravel. Any convenient means can be employed to create a pressure difference between the inlet and exhaust conduits to urge air through the gas distributing means. Examples include a vacuum source at the exhaust, an air compressor at the inlet, or a fan or blower. The gas distributing means is preferably connected by a conduit to a wind powered turbine located outside the container. The wind turbine urges air through the pipes allowing oxygen to diffuse into the soil for the biodegradation. By using the wind turbines, the system is completely self-operating and requires no other energy for operation.

The distance between the gas distributing means and, thus, the number of venting layers used, is a function of the air permeability of the soil layers. The height of compacted, contaminated soil placed between the gas distributing means will vary between one-half to two meters for most soils. For most projects more than one set of vent lines will be required.

Optionally, one or two pipes can be installed at the low end of the container in order to be able to remove water from the system in the case of unanticipated flooding or if circulation of water is employed to accelerate remediation.

BRIEF DESCRIPTION OF THE DRAWINGS

One particularly desirable embodiment of the invention is illustrated in FIGS. 1 and 4.

FIG. 1 is a plan view of the apparatus.

FIG. 2 is an elevation of the apparatus

FIG. 3 is an elevation of the apparatus.

FIG. 4 is an isometric view showing the inside of the apparatus. For clarity the container is shown absent soil and porous media shown in FIGS. 2 and 3.

DESCRIPTION OF THE PREFERRED EMBODIMENTS

A container is defined by a rectangular excavation in the surface of the earth which is lined on the sides and bottom with an impermeable liner 2 similar to a swimming pool liner. Inlet conduit 4 connects from the atmosphere to a conduit grid consisting of slotted conduits 5A, 5B, 5C, 5D and 5E which are in communication with a porous media, such as pea gravel, forming a layer in the bottom of the container, the slotted conduit and porous media together forming a first gas distributing means. The connection of conduit 4 with the conduit grid is shown near the intersection of slotted conduits 5C and 5E. Exhaust conduit 6 is also connected to the conduits grid near the intersection of slotted conduit 5A and 5D and extends outside the container to exhaust turbine 7 in the atmosphere, the turbine 7 preferably being a wind turbine which in response to the force of the wind causes a flow to be induced out of the exhaust conduit, thus urging air into the slotted conduits 5A, 5B, 5C, 5D and 5E through inlet conduit 4. A first layer of contaminated soil 9 is formed as a layer on the first gas distributing means, and together form a first treatment course.

A second treatment course comprises a second gas distributing means and a second layer of contaminated soil. The second gas distributing means consists of a porous media and a second conduit grid consisting of slotted conduits 15A, 15B, 15C, 15D and 15E located on top of layer 9. The second gas distributing means communicates with the atmosphere through inlet conduit 24 and exhaust conduit 26 to exhaust turbine 27 which functions in the same manner as the turbine 7 described above in connection with the first gas distributing means. A second layer of contaminated soil 29 is formed as a layer on the second distributing means to comprise the second treatment course. The top of the container is closed with cover 3.

Although only two treatment courses are illustrated, it is clear that there is no upper limit on the number of treatment courses. Further, although it is desirable for a gas distributing means to subtend each layer of contaminated particulate matter, it is considered that the scope of this invention includes a first treatment course absent a subtending gas distributing means.

Two examples are included which illustrate to one skilled in the art how to specify the maximum thickness of the layers of soil and the desirable nutrient and moisture content of the soil according to the following general procedures.

Soil moisture was determined by weighing, drying and reweighing soil samples. Field moisture content was determined by saturation of a soil sample in a packed column and draining the column under pressure and/or vacuum. After the column had drained, the soil was weighed, dried and reweighed. Air permeability was measured by passing air under pressure through a packed column of soil and measuring both the flow rate and pressure drop across the column. Clay content and particle size distribution were determined visually using a microscope.

Bacterial densities in soil samples were determined by performing serial dilutions on the samples. Total bacteria are enumerated by plating dilutions on 1/10 strength BBL Nutrient Agar and incubating the plates at 24° C. and ambient atmosphere. Gasoline degrading bacteria were determined by plating and dilutions on a carbon-free mineral salts agar and incubating the plates at 24° C. under an atmosphere containing gasoline vapors. The plates were incubated for 96 hours and counted.

Stimulation tests were performed by spraying soil samples with measured quantities of Restore 375 microbial nutrient compound while an equal volume of distilled water was added to the control sample. (Restore 375 is a registered trademark of FMC Corporation for a nutrient composition containing 0.8 to 8 parts by weight of nitrogen per part of phosphorus, the phosphorus being present as orthophosphate and tripolyphosphate.) The soil samples were placed in sealed bottles for 96 hours. The bottles were then opened and bacterial counts determined as described above. The soil is not considered to be nutrient limited if the bacterial count does not increase with added nutrient.

EXAMPLE 1

A service station was being refit with new product and waste oil tanks. During this process it was discovered that the waste oil tank and one of the fill pipes had leaked. In order to install the new tanks some action had to be taken regarding the contaminant that would be removed during replacement of the old tanks and expansion of the pit to accept the increase (from three to four) in the number of tanks. It was determined that approximately 400 cubic meters of soil would have to be treated on site or removed to a secure land fill at a cost of $100,000.

A composite sample of soil indicated a moisture content of 23% compared with 29% to 35% for field saturation. The soil had a clay content of 15% and an average particle size of 13 $\mu$m with a range of 3 to 100 $\mu$m. The air permeability was found to be 205 ml/min at 108 kPa (4 psig) for a 4.44 cm high column of soil with a diameter of 4.44 cm. The pressure drop was 6.9 kPa.

The soil moisture content was slightly above optimum for biodegradation rates and thus only enough water to distribute nutrients was added to the soil during construction. The small particle size and the moisture content indicate that both air and water permeability will be moderately low and thus the vent pipes will need to be placed relatively close. Based on the above data, the soil layers were approximately 0.6 to 1.0 meters thick. The soil layer thickness is important because large lifts will result in increased remediation times and unnecessarily small lifts will increase the construction time and thus cost.

The results of the microbial enumeration tests are shown below in Table I. All soil samples contained from $10^6$ to $10^9$ colonies of total bacteria per gram of soil, demonstrating a viable microbial community and good environmental conditions. The populations of hydrocarbon degrading bacteria were also in the same range as the total bacteria indicating the microbial community to have a strong potential to degrade petroleum hydrocarbons.

Both the total hydrocarbon degrading bacteria counts were extremely high in the soil composite. Typically, bacterial counts of $10^4$ to $10^6$ are found in soils from petroleum hydrocarbon spills. Populations of $10^8$ and $10^9$ are typically seen only if there are nutrients already present.

Samples of the soil composite were sprayed with either solutions of Restore 375 microbial nutrient, deionized water or tap water and then incubated for two days. All samples continued to have the high bacterial populations. These results indicate that there is no need to be concerned over the detrimental effects of chlorination when using city water for nutrient make up, the high bacterial populations needed for biodegradation are maintained.

The degradation process was not found to be limited by nutrient availability. An addition level of 10 ppm of Restore 375 microbial nutrient was adequate to maintain the bacterial populations. Since it is impractical to distribute such a low level evenly throughout the soil, 30–70 ppm of Restore 375 microbial nutrient was used.

EXAMPLE 2

A second service station was being refit with tanks and it was discovered that about 400 cubic meters of soil had been contaminated with petroleum hydrocarbons. Moisture content was found to be about optimum, 16.2 to 17.5% compared with field saturation of 29.0 to 30.6%. The soil had a clay content of 20% and the particle size averaged 250 $\mu$m and ranged between 10 and 4000 $\mu$m. Air permeability was measured at 175 ml/min at 239 kPa (20 psig) for a 8.9 cm high column of coil with a diameter of 4.44 cm. The pressure drop was 119 kPa. This suggested an optimal soil layer of about 9.9 meters. The results of the microbial enumeration tests are shown below in Table II. The composite without further treatment contained $6 \times 10^8$ colonies of total bacteria per gram of soil demonstrating a viable microbial community and good environmental conditions. The populations of hydrocarbon degrading bacteria were also high, $2 \times 10^7$ colonies per gram of soil, indicating the microbial community to have a strong potential to degrade petroleum hydrocarbons.

Both the total and hydrocarbon degrading bacteria counts were relatively high in the soil composite. Typically, bacterial counts of $10^4$ to $10^6$ are found in soils from petroleum hydrocarbon spills. The observed high microbial populations may be a result of oxygen availability during the period the soil was removed and stockpiled.

Samples of the soil composite were sprayed with either solutions of Restore 375 microbial nutrient or deionized water and then incubated for two days. All of the samples showed no change in the numbers of gasoline degrading bacteria. The sample treated with deionized water showed a ten-fold decrease in total bacteria while both nutrient treated samples showed a three to five-fold increase in total bacteria. These results indicate that as expected, with the low contamination level, the degradation process is not critically limited by nutrient availability. An addition level of 10 ppm of Restore 375 microbial nutrient appeared to be adequate to maintain the bacterial populations. Since it is impractical to distribute such a low level evenly throughout the soil, 30–70 ppm of Restore 375 microbial nutrient were used. Additional tests conducted with the soil from the site demonstrated that the low level of chlorine present in tap water does not result in any detrimental effects to the microbial community.

TABLE 1

Microbiological Assessment of Soil Example 1

| Sample Conditions | Bacteria Counts ($10^8$ CFU/gm) | |
|---|---|---|
| | Total | Hydrocarbon Degraders |
| As Received (Composite) | 40 | 13 |
| Sprayed w DI Water | 21 | 1 |
| Sprayed w Tap Water | 12 | 1 |
| Sprayed w 10 ppm Restore 375 | 51 | 1 |
| Sprayed w 100 ppm Restore 375 | 9 | 1 |

TABLE II

Microbiological Assessment of Soil Example 2

| Sample Conditions | Bacteria Counts ($10^8$ CFU/gm) | |
|---|---|---|
| | Total | Hydrocarbon Degraders |
| As Received (Composite) | 6 | 0.2 |
| Sprayed w DI Water | 1 | 0.3 |
| Sprayed w 10 ppm Restore 375 | 21 | 0.3 |
| Sprayed w 100 ppm Restore 375 | 31 | 0.2 |

We claim:

1. An apparatus for confining and aerobically biodegrading an organic compound contaminating a mass of particulate solids, the apparatus comprising a container having sides and a bottom, said sides and bottom being impermeable to water and to the organic compound contaminating the particulate solids, a cover for the container suitable for excluding liquids and solids from entering the container, and at least two superposed treatment courses disposed in a generally horizontal attitude in said container, each treatment course comprising (i) a mass of particulate solids contaminated by an organic compound and distributed as a layer in a generally horizontal attitude, and having microorganisms therein which biodegrade the organic compound, said layer having a thickness which is adjusted to permit the diffusion of a sufficient quantity of a gas containing oxygen into said layer to maintain said layer aerobic, said layer having a moisture content which is adjusted to from about 2% to about 90% of field saturation, and said layer having a nutrient content which is adjusted to provide sufficient phosphorus and nitrogen nutrients to ensure that the microorganisms in the particulate solids are not nutrient limited and to stimulate the biodegradation of the organic compound therein, and (ii) gas distributing means disposed under and in contact with said layer for distributing a gas containing oxyen to said layer so that said layer is maintained aerobic through diffusion of said gas into said layer as aforesaid, and being separated from an adjacent gas diffusion means by the thickness of an adjacent layer of said contaminated material, said gas distributing means being connected by inlet conduit means to a source of said gas containing oxygen, exhaust conduit means for exhausting gas from said gas distributing means, and means for urging the gas containing oxygen into the gas distributing means.

2. The apparatus of claim 1 wherein the particulate solids are soil and the organic compound is a petroleum product.

3. The apparatus of claim 1 wherein the container is defined by excavating a pit in the earth and lining the pit with a flexible lining impervious to the organic compound and to water.

4. The apparatus of claim 3 wherein the cover is black top paving.

5. The apparatus of claim 1, further comprising a wind turbine connected in flow communication with said gas distributing means and configured to urge gas into said gas distributing means in response to wind.

6. A method for confining and aerobically biodegrading an organic compound contaminating a mass of particulate solids, the method comprising providing a container, said container having (i) sides and a bottom impermeable to water and to the organic compound contaminating the particulate solids, and (ii) a cover for the container suitable for excluding liquids and solids from entering the container, adjusting the composition of said particulate solids as necessary to provide therein (i) a moisture content from about 2% to about 90% of field saturation, (ii) a population of microorganisms which biodegrade the organic compound, and (iii) sufficient phosphorus and nitrogen nutrients to ensure that the microorganisms are not nutrient limited and to stimulate the biodegradation of the organic compound therein, distributing the contaminated particulate solids into at least two superposed generally horizontal layers within the container, distributing a gas containing oxygen to each layer from beneath the layer, and adjusting the thickness of each layer of contaminated particulate solids to permit the diffusion of a sufficient quantity of the gas containing oxygen into each layer to maintain each layer substantially aerobic.

7. The method of claim 6 wherein the container is defined by excavating a pit in the earth and lining the pit with a flexible lining impervious to the organic compound and to water.

8. The method of claim 6 wherein the organic compound is a petroleum product and the particulate solids are soil.

9. The method of claim 6 wherein the gas containing oxygen is air and is distributed to the particulate solids by providing an air-permeable conduit below each layer, connecting the conduit in flow communication with the atmosphere, and urging air from the atmosphere into the conduit.

10. The method of claim 9 wherein the air is urged into the conduit using a wind turbine.

* * * * *